(12) United States Patent
Olofsson et al.

(10) Patent No.: US 7,459,214 B2
(45) Date of Patent: *Dec. 2, 2008

(54) BINDER AND A PACKAGING LAMINATE COMPRISING THE BINDER

(75) Inventors: Torsten Olofsson, Romont (CH); Bertrand Jaccoud, Siviriez (CH)

(73) Assignee: Tetra Laval Holdings & Finance S.A., Pully (CH)

( * ) Notice: Subject to any disclaimer, the term of this patent is extended or adjusted under 35 U.S.C. 154(b) by 242 days.

This patent is subject to a terminal disclaimer.

(21) Appl. No.: 10/542,575

(22) PCT Filed: Feb. 11, 2004

(86) PCT No.: PCT/SE2004/000173

§ 371 (c)(1), (2), (4) Date: Jul. 19, 2005

(87) PCT Pub. No.: WO2004/076580

PCT Pub. Date: Oct. 9, 2004

(65) Prior Publication Data

US 2006/0134355 A1 Jun. 22, 2006

(30) Foreign Application Priority Data

Feb. 28, 2003 (SE) .................... 0300553
Feb. 28, 2003 (SE) .................... 0300554

(51) Int. Cl.
*B32B 13/12* (2006.01)
*B32B 27/06* (2006.01)
*B32B 27/36* (2006.01)

(52) U.S. Cl. .......... 428/451; 428/35.7; 428/34.4; 428/448; 428/452; 428/483; 428/516; 428/523

(58) Field of Classification Search ........ 428/35.7, 428/34.4, 448, 451, 452, 483, 516, 523

See application file for complete search history.

(56) References Cited

U.S. PATENT DOCUMENTS

| 4,632,959 A * | 12/1986 | Nagano ............ 525/70 |
| 4,639,398 A | 1/1987 | Bergstrom |
| 5,731,092 A | 3/1998 | Breant et al. |
| 6,455,637 B1 * | 9/2002 | Jackson et al. ........ 525/191 |
| 7,122,234 B2 * | 10/2006 | Olofsson et al. ...... 428/36.91 |
| 2002/0176974 A1 * | 11/2002 | Hanyu et al. ........ 428/213 |

FOREIGN PATENT DOCUMENTS

| JP | 2000095233 | 4/2000 |
| WO | 9826994 A1 | 6/1998 |

* cited by examiner

*Primary Examiner*—Michael C Miggins
(74) *Attorney, Agent, or Firm*—Buchanan, Ingersoll & Rooney PC

(57) ABSTRACT

A binder for a packaging laminate, which binder comprises a polyolefin grafted with an unsaturated alkoxysilane. According to the invention, the grafted polyolefin is blended with a non-grafted polyolefin, in said binder, whereby the flexibility of the binder is improved, which in turn provides for an increased number of adhesion points when the binder is used in a binding layer in the packaging laminate. The invention also relates to packaging laminate (10, 30, 40, 50) comprising the binder and to a packaging container (60) formed form the packaging laminate.

22 Claims, 4 Drawing Sheets

BINDER AND A PACKAGING LAMINATE COMPRISING THE BINDER

TECHNICAL FIELD

The present invention relates to a binder to be used in a packaging laminate, especially a packaging laminate comprising a silicon oxide layer. The invention also relates to the packaging laminate comprising the binder and to a packaging container produced from the packaging laminate.

PRIOR ART AND PROBLEMS

U.S. Pat. No. 5,731,092 discloses a packaging material comprising a film covered with silicon oxide and a polyolefin film, wherein a binder arranged between the silicon oxide and the polyolefin film is selected from the group consisting of polyolefins grafted with unsaturated alkoxysilanes, polyolefins grafted with un-saturated epoxides, and copolymers of ethylene and of at least one unsaturated epoxide. The grafted polyolefin binder is arranged as a binding layer in contact with the silicon oxide layer and binding the same to the polyolefin film.

Although it has been shown that the grafted polyolefin as such, according to U.S. Pat. No. 5,731,092, provides for a good adhesion to silicon oxide, it has now been found that the internal adhesion in a packaging laminate, between a silicon oxide layer and an adjacent layer, such as the mentioned polyolefin film, when using the grafted polyolefin in a binding layer them between, does not get as good as would be expected. Accordingly, undesirable delamination may occur, through failure of the binding layer.

Packaging laminates comprising a paper or paperboard bulk layer, a first gas barrier layer of SiOx, coated onto a first polymer carrier layer, a first outermost layer of a heat-sealable polyolefin and a second outermost layer of a heat-sealable polyolefin on the opposite side of the laminate, are known from e.g. WO94/29103.

In the high-speed, continuous packaging processes well known for the paperboard packages of the Tetra Brik®-type, a web of the packaging laminate is continuously formed into a tube, filled with contents and sealed off to pillow-shaped packaging containers by a simultaneous heat sealing and cutting operation. The pillow-shaped packaging container is then normally fold formed into a parallelepipedic packaging container. The main advantage of this continuous tube-forming, filling and sealing packaging process concept is that the web may be sterilised continuously just before tube-forming, thus providing for the possibility of an aseptic packaging process, i.e. a process wherein the liquid content to be filled in as well as the packaging material itself are reduced from bacteria and the filled packaging container is produced under clean circumstances such that the filled package may be stored for a long time even at ambient temperature, without the risk of growth of micro-organisms in the filled product. An important factor for long-term storage is of course also the gas barrier properties of the filled and sealed packaging container, which in turn is highly dependent on the gas barrier properties of the packaging laminate itself. An other important advantage of the Tetra Brik®-type packaging process is, as stated above, the possibility of continuous high-speed packaging, which has considerable impact on cost efficiency.

The advantages of a SiOx gas barrier layer compared to other gas barrier materials are firstly that it has a positive environmental profile, secondly, that it is not affected when in contact with surrounding moisture or liquid and since it is applied in very thin layers, it is also flexible and resistant to cracking when bent or folded. Moreover, it allows for the contents of a package formed from the packaging laminate to be subjected to microwave heating, while the contents are in the package.

However, for long time storage even at ambient temperatures, the gas barrier properties of the package not only depend on the gas barrier properties of the packaging laminate, but also greatly depend on the quality of the seals of the final package. If the seals are of poor quality, oxygen will penetrate into the contents of the package notwithstanding how good the gas barrier properties of the laminate are.

ACCOUNT OF THE INVENTION

It is, therefore, an object of the present invention to overcome or alleviate the above-described problem related to adhesion of a binding layer comprising a grafted polyolefin, arranged between a silicon oxide layer and an adjacent layer, in a packaging laminate.

It is also an objective of the present invention to provide a packaging laminate that alleviates the above discussed disadvantages and problems concerning gas barrier properties in the seals of a package having a SiOx gas barrier layer.

Hence, it is an objective of the present invention to provide a packaging laminate having gas barrier properties, both in respect of the packaging laminate itself and the seals of a package produced from it, suitable for aseptic packaging and long-term storage, as well as sufficient bending stiffness to be suitable for continuous, high speed packaging of liquid foods by means of a continuous tube-forming process.

The invention is also directed to a packaging container filled with solid, semi-solid or liquid food or beverage and produced from the packaging laminate of the invention.

One object of the invention is to provide a binder for a packaging laminate, which binder comprises a polyolefin grafted with an unsaturated alkoxysilane, in essence according to U.S. Pat. No. 5,731,092, but which binder provides for improved adhesion between a silicon oxide layer and an adjacent layer, in a packaging laminate.

Another object is to provide a packaging laminate comprising a binding layer of such a binder, arranged between a silicon oxide layer and an adjacent layer, in the packaging laminate, which packaging laminate is improved in respect of delamination properties, mainly at wet conditions, i.e. which packaging laminate can not be delaminated in the binding layer at wet conditions. The packaging laminate according to the invention may be converted into a sealed package for food products, preferably liquid food products.

These and other objects are achieved by the binder, the packaging laminate and the packaging container according to the appended claims.

More specifically, it has now been found that the grafted polyolefin binder of U.S. Pat. No. 5,731,092 can be improved in respect of its adhesion properties if being blended with a non-grafted polyolefin.

Surprisingly, it has been found that the number of adhesion points between the grafted sites in the binder and the silicon oxide can be vastly increased if the grafted polyolefin is blended with a non-grafted polyolefin, i.e. the number of adhesion points increases despite less grafted sites in the binder polymer!

The invention is based on the insight that it is not only the number of grafted sites that affects the degree of adhesion, but also their ability to physically come in contact with the silicon oxide. It has been found that the grafting of polyolefin according to U.S. Pat. No. 5,731,092 results in a cross-linking of the polyolefin, which makes the polyolefin less flexible than the non-grafted polyolefin. Due to the impaired flexibility of the grafted polyolefin, the number of contact points between the binding layer composed of the grafted polyolefin and the silicon oxide will be less than for a binding layer solely composed of a non-grafted polyolefin of the same type. However, in a binding layer solely composed of a non-grafted polyolefin, the adhesion in an individual adhesion point of the plurality of adhesion points will not be as good as in an individual adhesion point of a binding layer composed solely of a grafted polyolefin.

The present invention solves the problem related to these contradictory aspects of grafted and non-grafted polyolefin binders, by providing a binder that is a blend of a grafted polyolefin and a non-grafted polyolefin. Here, the improved flexibility that is achieved due to the presence of a non-grafted polyolefin provides for an increased number of adhesion points, while the grafted polyolefin provides for improved adhesion in those points, all in all resulting in adhesion properties that are better than the adhesion properties of a grafted polyolefin binder per se and a non-grafted polyolefin binder per se.

According to one aspect of the invention, the polyolefins which are grafted with alkoxysilanes are chosen from the group that consist of:
homopolymers of ethylene or of propylene;
copolymers of ethylene and of vinyl acetate;
copolymers or ethylene and of at least one alkyl(meth)acrylate. The alkyl groups of the alkyl(meth)acrylate has up to 10 carbon atoms and can be linear, branched or cyclic. Mention may be made, by way of illustration of the alkyl(meth)acrylate, of in particular n-butyl acrylate, methyl acrylate, isobutyl acrylate, 2-ethylhexyl acrylate, cyklohexyl acrylate, methyl methacrylate or ethyl methacrylate. Preference is given, among these (meth)acrylates, to ethyl acrylate, methyl acrylate, n-butyl acrylate and methyl methacrylate;
copolymers of ethylene and of an alpha-olefin such as butene or hexane;
amorphous poly(alpha-olefin)s (APAO). Use is preferably made of the APAOs derived from ethylene, propylene, butene or hexane. Use is advantageously made either of ethylene-propylene-butene copolymers with a high butene content or of ethylene-propylene-butene copolymers with a high propylene content or of homo- or copolymers of butene.

Use is advantageously made of ethylene-alkyl(meth)acrylate copolymers.

Most preferably, said grafted polyolefin and said non-grafted polyolefin are polyolefins of the same type, according to the above, preferably polyethylene type polyolefins.

Mention may be made, among alkoxysilanes carrying an unsaturation, of:
$CH_2=CH—Si(OR)_3$, vinyltrialkoxysilanes
$CH_2=CH—CH_2—Si(OR)_3$, allyltrialkoxysilanes
$CH_2=CR_1—CO—O—Y—Si(OR)_3$
(meth)acryloxyalkyltrialkoxysilanes (or (meth)acrylsilanes) in which:
R is an alkyl having from 1 to 5 carbon atoms or an alkoxy $—R_2OR_3$ in which $R_2$ and $R_3$ are alkyls having at most 5 carbon atoms for the combined unti $R_2$ and $R_3$;
$R_1$ is a hydrogen or methyl;
Y is an alkylene having from 1 to 5 carbon atoms.

Use is made, for example, of vinylsilanes, such as trimethoxyvinylsilane, triethoxyvinylsilane, tripropoxyvinylsilane, tributoxyvinylsilane, tripentoxyvinylsilane or tris(β-methoxyethoxy)vinylsilane, allylsilanes, such as trimethoxyallylsilane, triethoxyallylsilane, tripropoxyallylsilane, tributoxyallylsilane or tripentoxyallylsilane, or acrylsilanes, such as acryloxymethyltrimethoxysilane, methacryloxymethylmethoxysilane, acryloxyethyltrimethoxysilane, methacryloxyethyltrimethoxysilane, acryloxypropyltrimethoxysilane, methacryloxypropyltrimethoxysilane, acryloxybutyltrimethoxysilane, methacryloxybutyltrimethoxysilane, acryloxyethyltriethoxysilane, methacryloxyethyltriethoxysilane, methacryloxyethyltripropoxysilane, acryloxypropyltributoxysilane or methacryloxypropyltripentoxysilane.

It is also possible to use mixtures of these products.
Use is preferably made of:
$CH_2=CH—Si—(OCH_3)_3$, vinyltrimethoxysilane (VTMO)
$CH_2=CH—Si—(OCH_2CH_3)_3$, vinyltriethoxysilane (VTEO)
$CH_2=CH—Si(OCH_2OCH_2CH_3)_3$ vinyltrimethoxyethoxysilane (VTMOEO)
and (3-(methacryloxy)propyl)trimethoxysilane $CH_2=C(CH_3)—CO—O—(CH_2)_3—Si(OCH_3)_3$.

The polyolefins can be grafted in the molten state in the presence of radical initiator(s).

The grafting reaction is carried out in a single- or twin-screw extruder feed with polyolefins in a feed hopper, for example in the from of granules; the polyolefins are melted by heating in a first region of the extruder and, in a second region, the reactants are introduced into the molten mass of the polyolefins.

The radical initiators can be chosen from peroxides, peracids, peresters or peracetals. They are generally used in the proportion of 0.01% to 0.5% by mass with respect to the polyolefins to be grafted.

Mention may be made, by way of example, of:
dicumyl peroxide (DICUP),
2,5-dimethyl-2,5-di(tert-butylperoxy)hexane (DHBP),
α,α'-(di-tert-butylperoxyisopropyl) benzene (Y1490).

It is preferable to dissolve the radical initiator in the liquid vinylalkoxysilane before introducing them, for example by means of a metering pump, into the polyolefins in the molten state.

It is preferable for the region for introduction of the reactants to be sufficiently long and at a sufficiently low temperature to ensure good dispersion of the reactants and the smallest possible thermal decomposition of the radical initiator.

The grafting reaction proper takes place in a third region of the extruder at a temperature capable of providing for complete decomposition of the radical initiator; before the exit of the molten mass at the extruder head, a degassing region is provided for where the decomposition products from the initiator and the unreacted vinylsilane are degassed, for example under vacuum.

The grafted polyolefins are recovered at the extruder outlet, for example in the form of granulated rods, after cooling under cold air.

The ratio by weight of the grafts to the grafted polymer is generally between 0.1 and 5% and preferably 0.15 to 2.5%.

According to one aspect of the invention, the binder comprises 30-70%, preferably 40-60% and even more preferred 45-55% by weight of the grafted polyolefin.

According to another aspect of the invention, the binder may be constituted of a dry blend of the grafted polyolefin and the non-grafted polyolefin. This may be realized for example by dry blending grafted polyolefin granules with non-grafted polyolefin granules, such that they will melt together in connection with the melting when the binder is applied as a binding layer in the packaging laminate, by extrusion e.g.

On the other hand, the binder may be constituted of a compound blend of the grafted polyolefin and the non-grafted polyolefin, i.e. the grafted and non-grafted polyolefins being intimately blended with each other, at molecular level, already before the binder is melted in connection with the application of the binder as a binding layer in the packaging laminate. This may be realized for example by individual granules being produced, that are composed of a blend of the grafted polyolefin and the non-grafted polyolefin.

The invention also relates to a packaging laminate comprising a film covered with silicone oxide, which packaging laminate comprises a binder according to the above, which binder is arranged as a binding layer, to bond the silicon oxide to an adjacent layer, in the laminate.

The film (carrier layer) covered with silicon oxide is preferably a film of polyester or polyamide, preferably a film of a polymer selected from mono- or biaxially oriented polyethyleneterephtalate (PET), mono- or biaxially oriented polyethylenenaphtenate (PEN), mono- or biaxially oriented polyamide (PA) or mono- or biaxially oriented polybutylene terephthalate (PBT).

The adjacent layer, to which the silicon oxide is bonded by the binder, may be a polyolefin film, made e.g. of polyethylene, polypropylene or copolymers of ethylene, such as, for example, ethylene-propylene, ethylene-butene, ethylene-hexene, ethylene-alkyl(meth)acrylate or ethylene-vinyl acetate copolymers. The choice of the material for this layer may provide for a transparent packaging laminate, to be used e.g. in a transparent pouch for food. However, according to another embodiment of the packaging laminate, the adjacent layer may alternatively be composed essentially of paper or paperboard.

According to one aspect of the invention, the binding layer in the packaging laminate, composed by the inventive binder, amounts to 2-35 $g/m^2$, preferably 5-30 $g/m^2$ and even more preferred 10-25 $g/m^2$, calculated on dry matter.

According to one embodiment of the packaging laminate, the binding layer composed of the inventive binder may be extruded to constitute a sole binding layer between the silicon oxide and the adjacent layer, in which case the binding layer preferably amounts to at least 10 $g/m^2$, preferably 10-35 $g/m^2$, more preferably 10-30 $g/m^2$ and even more preferred 10-25 $g/m^2$, calculated on dry matter.

According to another embodiment of the packaging laminate, the binding layer composed of the inventive binder may be co-extruded together with a polyolefin layer that is free from said grafted polyolefin, the binding layer being disposed in contact with the silicon oxide. In this case, it may suffice to have a binding layer composed of the inventive binder, that amounts to 2-20 $g/m^2$, preferably 2-15 $g/m^2$ and even more preferred 2-10 $g/m^2$, calculated on dry matter. The polyolefin that is co-extruded together with the binding layer composed of the inventive binder, is preferably a polyolefin of the same type as the grafted and non-grafted polyolefin of the binder, most preferably a polyethylene polyolefin.

It has furthermore been found that by providing a packaging laminate according to the introduction with a second outermost layer of a heat-sealable polyolefin comprising a metallocene polyethylene material, on the side of the laminate that is intended to face the interior of the packaging container to be formed from the same, the gas barrier properties of the seals of the packaging container can be improved to match the very good gas barrier properties of the SiOx gas barrier layer.

Suitably, said metallocene polyethylene material is a metallocene low density polyethylene material, preferably a metallocene linear low density polyethylene material.

According to one aspect of the invention, the basis weight of the metallocene polyethylene layer is from 5 to 30 $g/m^2$, preferably from 8 to 25 $g/m^2$, more preferably from 10 to 20 $g/m^2$, dry calculated.

According to another aspect of the invention, a third layer of a heat-sealable polyolefin, preferably a polyethylene material, is arranged in direct contact with the metallocene polyethylene layer and preferably co-extruded together with it. Suitably, this third layer is extruded at a higher temperature than the metallocene polyethylene layer. The difference in extrusion temperature provides for improved adhesion by the third (high temperature extruded) heat-sealable polyolefin layer and for avoiding off-taste problems by the second (low temperature extruded) metallocene polyethylene layer. Typically, the third layer is extruded at temperatures well above 300° C., preferably above 310° C. and even more preferred at 320° C. or above, while the second layer is extruded at temperatures well below 300° C., preferably below 290° C. and even more preferred at 280° C. or below.

A laminate according to the invention is especially well adapted to be used in connection with ultrasonic vibration heat sealing. A feature of the ultrasonic vibration heat sealing technique is that the entire material under pressure between the ultrasonic horn and the anvil jaw is heated up by the vibrations at the same time. For a strong seal to take place, it is enough that the outermost layer (i.e. the outermost layer on the side of the laminate that is facing the inside of the container) reaches the melting point. As a consequence it is enough to provide only a thin sealing ply of the metallocene polyethylene material in the inside layer, in order to decrease the sensibility of the ultrasonic vibration heat sealing process and to achieve strong, air-tight and liquid-tight seals.

The SiOx layer is preferably deposited on the carrier layer by PECVD technique, wherein x=1.7-2.0, at a thickness of from about 50 to about 500 Å, preferably from about 80 to about 300 Å. There exist alternative methods of depositing inorganic layers, such as SiOx, onto polymer films, which however, generally result in thicker and less flexible layers of the SiOx. This in turn, due to the formation of cracks in the SiOx layer, generally results in laminates of lower quality with regard to oxygen barrier properties. It is thus preferred according to the invention that the SiOx gas barrier layers are applied by means of the continuous method of plasma enhanced chemical vapour deposition, PECVD, of SiOx from a plasma of an organic silicon compound, such as hexadimethylsiloxane (HDMSO).

Preferably, the carrier layer of oriented polymer is a premanufactured film of polyester or polyamide, such as a cast film or preferably a mono- or biaxially oriented film of polyethyleneterephtalate (PET), polyethylenenaphtenate (PEN), polyamide (PA) or polybutylene terephthalate (PBT). By using premanufactured oriented polymer films as the carrier layers, it is ensured that they have some inherent bending stiffness relative to other layers in the laminate that are extrusion or coextrusion laminated.

Preferably, the thickness of the carrier polymer layer is from about 7 to about 30 μm, more preferably from about 8 to about 20, most preferably from about 8 to about 15 μm. It is known that the PECVD process works optimally with the above thickness of the carrier layer, which is also preferred from the economical point of view.

The paper or paperboard bulk layer is arranged to provide for the greatest contribution to the flexural rigidity of the laminate.

According to the invention, the packaging laminate comprises the inventive binding layer in direct contact with the SiOx gas barrier layer, which binding layer comprises a polyolefin grafted with an unsaturated alkoxysilane.

DESCRIPTION OF THE DRAWINGS

Further advantages and favourable characterising features of the present invention will be apparent from the following detailed description, with reference to the appended figures, in which:

FIG. 1 thus shows a packaging laminate 10, comprising a first polymer carrier layer 11a being a film of a preferably oriented polyester, such as for example polyethyleneterephtalate (PET), or a film of a preferably oriented polyamide (PA), onto which is coated a thin gas barrier layer of SiOx 13a by means of plasma enhanced chemical vapour deposition (PECVD).

Figure 1:
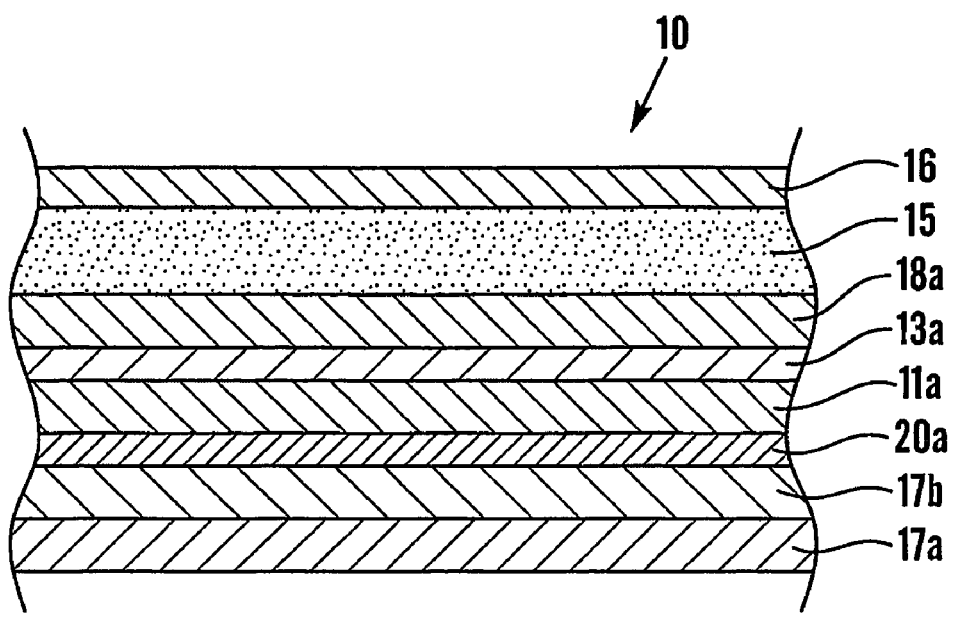
FIG. 1 is a cross-sectional view of a preferred laminated packaging material according to the present invention.

The thickest layer in the laminate is a bulk paper or paperboard layer 15. It is directly bonded to the SiOx layer 13a, by means of a binding layer 18a. In the binding layer 18a in contact with the layer of SiOx 13a and the paper or paperboard layer 15, there is used a blend of a polyethylene base polymer graft modified by an unsaturated alkoxysilane compound, and a corresponding non-grafted polyethylene polymer, which provides for exceptionally good adhesion between the SiOx layer 13a and the paper or paperboard layer 15. The binding layer 18a typically has a basis weight of 5-30 g/m$^2$, in this embodiment of the invention.

On the outside of the paper or paperboard layer 15, which will constitute the outside wall of a packaging container produced from the packaging laminate, is applied a first outermost layer 16 of a heat-sealable polyolefin, preferably a low density polyethylene (LDPE) or a linear low density polyethylene (LLDPE), which include also so-called metallocene-catalysed LLDPE's (m-LLDPE), i.e. LLDPE polymers catalysed by means of a single site catalyst. Other examples of alternative polymers for the outside packaging wall layer may be medium high density polyethylene (MDPE) or polypropylene (PP).

On the outside of the polymer carrier layer 11a, which will constitute the inside wall of a packaging container produced from the packaging laminate, is applied a second layer 17a of a heat-sealable polyolefin, preferably comprising a metallocene polyethylene material. Preferably, a third layer 17b of a heat-sealable polyolefin is arranged in direct contact with the second layer 17a of a heat-sealable polyolefin and is preferably co-extruded together with it, but beneficially at a higher temperature. Hence, the third layer 17b of a heat-sealable polyolefin is arranged between the polymer carrier layer 11a and the second layer 17a of a heat-sealable metallocene polyolefin. Preferably, the third layer of a heat-sealable polyolefin is a layer of LDPE, optionally LLDPE.

For optimal adhesion between the various layers of the packaging laminate, there are preferably used binding layers of adhesive polymers, tie layers and primers, known in the art. Such binding layers and primers are adapted to the specific choices of polymer in the various layers and may be selected from polyolefins and modified polyolefins, preferably polyethylene-based polymers, such as for example LDPE and modified LDPE.

Other examples of binding layers are LDPE homo- or copolymers or graft copolymers of polyethylene, grafted with monomers comprising carbo)ylic or glycidyl functional groups, such as acrylic monomers or maleic anhydride (MAH) monomers, for example ethylene (meth)acrylic acid copolymer (E(M)AA), ethylene-glycidyl(meth)acrylate copolymer (EG(M)A)) or MAH-grafted polyethylene (MAH-g-PE).

Any of the above discussed polymers may also be used in an optional binding layer 20a between the outer heat-sealable polyolefin layers 17a, 17b and the polymer carrier layer 11a.

Figure 2:
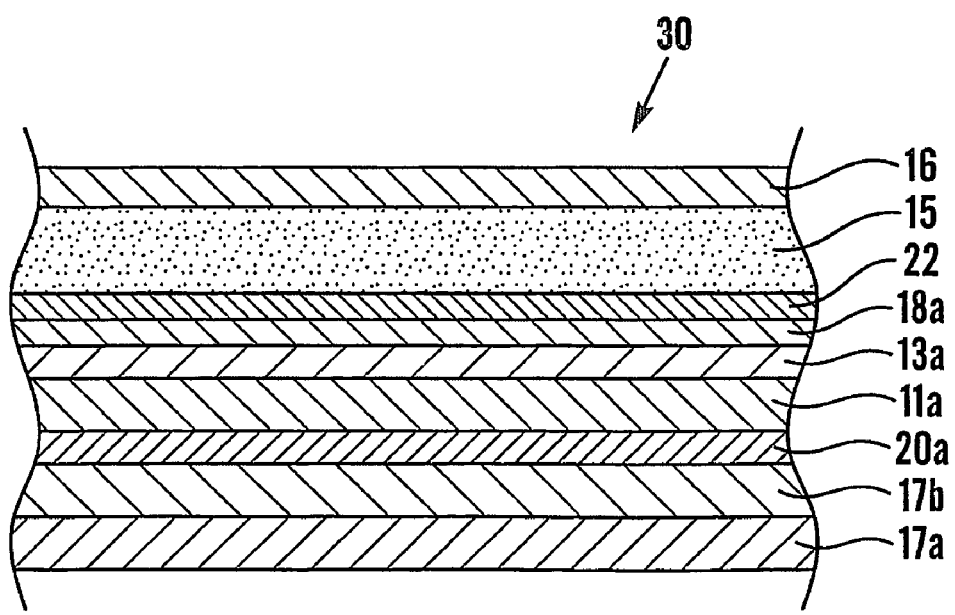
FIG. 2 is a cross-sectional view of a another embodiment of a laminated packaging material according to the present invention.

FIG. 2 shows a packaging laminate 30 according to another embodiment of the invention. The only difference in relation to the packaging laminate 10 of FIG. 1, is that the binding layer 18a, comprising a blend of a grafted and a non-grafted polymer, is thinner (typically 2-15 g/m$^2$) and instead complemented by a complementary binding layer 22 of non-grafted polyolefin polymer. Preferably, the two binding layers 18a and 22 have been co-extruded. In this way, the binding layer 18a of grafted and non-grafted blend provides for exceptionally good adhesion to the SiOx layer 13a, to which it faces directly, while the complementary binding layer 22 keeps costs down and still ensures that enough total binding layer is present.

Figure 3:
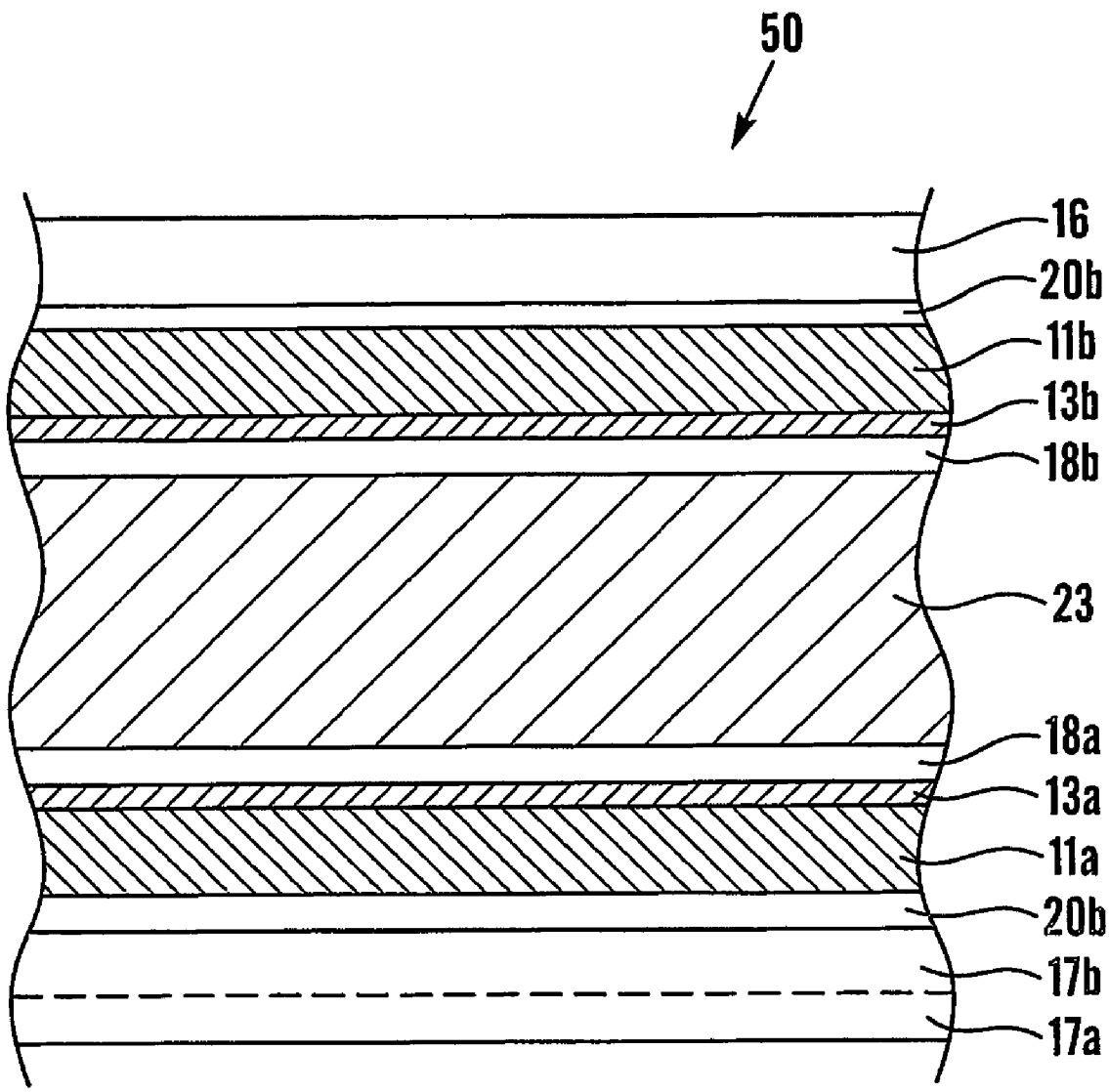
FIG. 3 is a cross-sectional view of a transparent laminated packaging material according to the present invention.

FIG. 3 shows a transparent packaging laminate 50, comprising a first and second carrier layer 11a, 11b in accordance with the above, onto which are coated thin gas barrier layers of SiOx 13a, 13b. The two SiOx layers are preferably directed towards the interior of the laminate, thus facing each other. Between the two carrier layers coated with gas barrier layers, is laminated an intermediate layer 23 of a relatively stiff olefin polymer, such as for example high density polyethylene (HDPE) or polypropylene (PP). The intermediate layer is thicker than any of the surrounding layers in the packaging laminate, and provides as such a distancing element between the two carrier layer films of oriented polymer. The preferred oriented polymer films have a certain degree of inherent stiffness in that they are oriented and thus may have a relatively higher degree of crystallinity than non-oriented polymer films. The olefin polymer of the intermediate layer also contributes with a certain degree of stiffness by itself to the packaging laminate as a whole. The so-called I-beam arrangement of two relatively stiff carrier layers laminated on each side of a thicker and relatively stiff intermediate polymer layer provides for a laminate having surprisingly good bending stiffness in relation to its thickness. In addition, the arrangement of the two PECVD-deposited SiOx-layers has proved to result in a much more than two-fold increased gas barrier, compared to a laminate or film containing merely one SiOx-layer. Thus, the arrangement of an intermediate layer also acting as a "buffer" for penetration of gas, in particular oxygen gas, provides for surprisingly improved gas barrier properties, which indicates a synergistic effect resulting from this particular arrangement.

Layers 16, 17a, 17b, 20a and 20b correspond to the layers having the same reference number in FIG. 1 and FIG. 2. (Layer 20b is of the same type as layer 20a). The binding layers 18a and 18b correspond to the binding layer 18a in FIG. 1. It is also conceivable, although not shown, that one or both of these binding layers 18a, 18b are co-extruded together with a complementary binding layer of non-grafted polyolefin polymer, as shown in FIG. 2.

Figure 4:
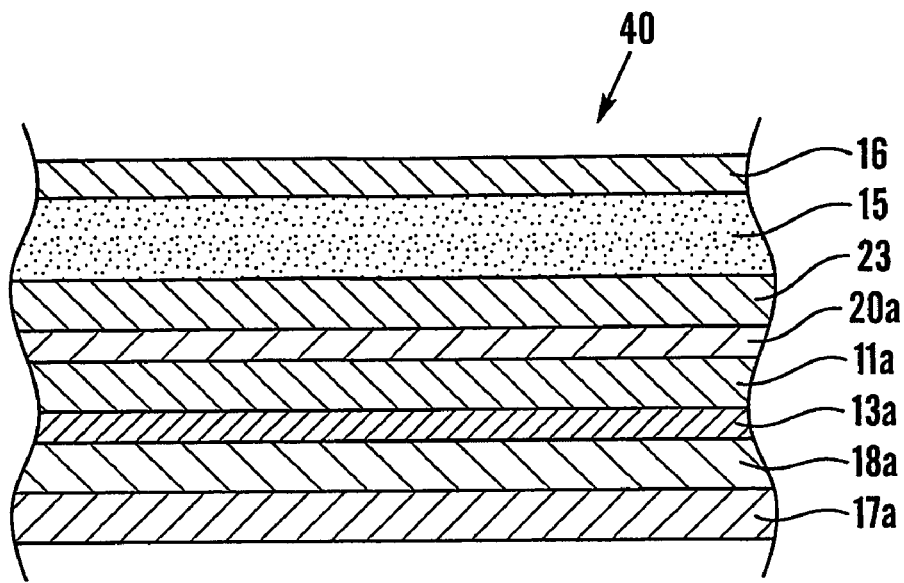
FIG. 4 is a cross-sectional view of a another embodiment of a laminated packaging material according to the present invention.

FIG. 4 shows a packaging laminate 40 according to yet another embodiment of the invention. The difference in relation to the packaging laminate 10 of FIG. 1, is that the polymer carrier layer 11a, with its coating 13a of SiOx, faces the other way in the laminate. Hence, the SiOx layer 13a is directly bonded to the second layer 17a of a heat-sealable polyolefin comprising a metallocene polyethylene material, by means of the binding layer 18a of grafted and non-grafted polymer blend. The primer 20a is still arranged in contact with the polymer carrier layer 11a and optionally there is a binding layer 23 of polyethylene e.g., between the primer 20a and the paper or paperboard layer 15.

Figure 5:
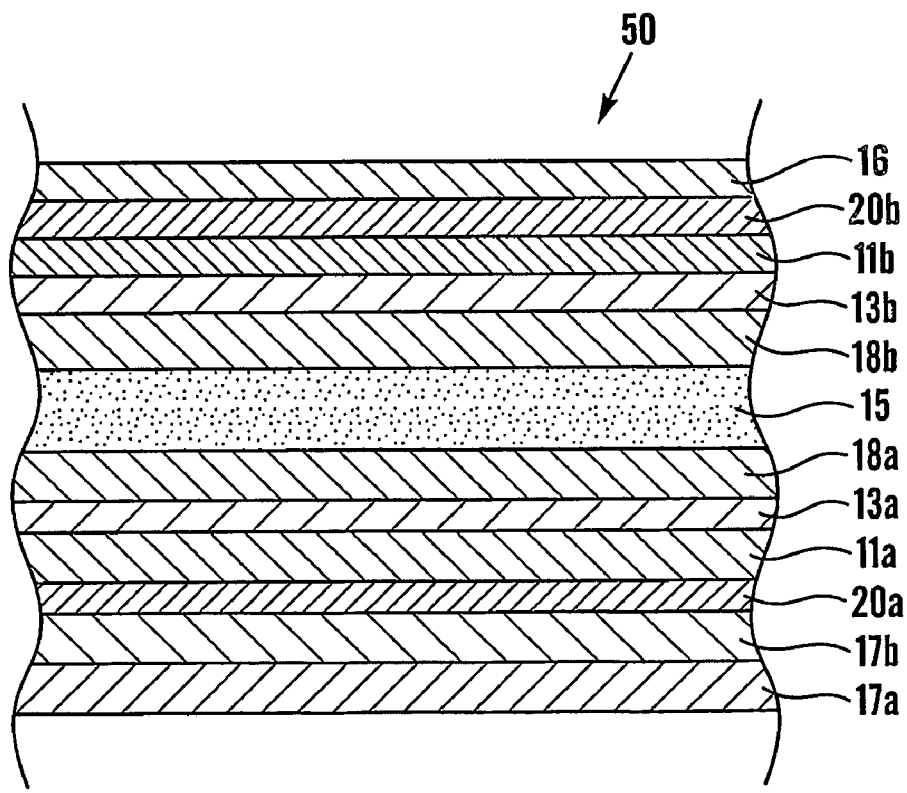
FIG. 5 is a cross-sectional view of a another embodiment of a laminated packaging material according to the present invention.

FIG. 5 shows a packaging laminate 50 according to yet another embodiment of the invention. Here, the layers 18a, 13a, 11a and 20a shown in FIG. 1 are "mirrored" in the paper or paperboard bulk layer 15, to form corresponding layers 18b, 13b, 11b and 20b on the side of the paper or paperboard bulk layer 15 that is intended to face the outside of the packaging container to be produced from the laminate. Of course, the layers 23, 20a, 11a, 13a and 18a shown in FIG. 4, could also be mirrored in layer 15 in a corresponding manner, to provide yet another embodiment of the invention. Also embodiments where just one of the SiOx layers is facing outwards in the laminate structure is conceivable.

It should be understood that the embodiments according to FIGS. 4 and 5 also may encompass that the binding layer(s) 18a, 18b is/are replaced by a thinner binding layer 18a, 18b that is co-extruded with a complementary binding layer 22 of non-grafted polyolefin polymer, just as is shown in FIG. 2, in which case the blended binding layer 18a, 18b directly faces the SiOx layer 13a, 13b.

The intermediate layer 15 of FIG. 5 is thicker than any of the surrounding layers in the packaging laminate, and provides as such a distancing element between the two carrier layer films 11a, 11b of oriented polymer. The preferred oriented polymer films have a certain degree of inherent stiffness in that they are oriented and thus may have a relatively higher degree of crystallinity than non-oriented polymer films. The paper or paperboard of the intermediate layer 15 also contributes to the stiffness of the packaging laminate as a whole. The so-called I-beam arrangement of two relatively stiff carrier layers laminated on each side of a thicker and relatively stiff intermediate paper or paperboard layer provides for a laminate having surprisingly good bending stiffness in relation to its thickness. In addition, the arrangement of the two PECVD-deposited SiOx-layers has proved to result in a much more than two-fold increased gas barrier, compared to a laminate or film containing merely one SiOx-layer. Thus, the arrangement of an intermediate layer also acting as a "buffer" for penetration of gas, in particular oxygen gas, provides for surprisingly improved gas barrier properties, which indicates a synergistic effect resulting from this particular arrangement.

If two layers of SiOx are used, the two corresponding carrier polymer films preferably have about the same or exactly the same thickness.

The packaging laminate 10, 30, 40, 50 according to the invention can be produced according to any suitable prior art principle known to the skilled man. For example, with reference to the laminate 10 shown in FIG. 1, the binding layer 18a may be extruded into a laminator nip, between the paper or paperboard bulk layer 15 and a premanufactured film of the SiOx coated polymer carrier layer 13a, 11a. The SiOx layer is treated by flame, plasma or corona treatment before being laminated to the paper or paperboard bulk layer.

Then, the primer 20a is applied by extrusion or coating and finally the first outermost layer 16 of a heat-sealable polyolefin is extruded onto the paper or paperboard bulk layer 15 and the second outermost layer 17a of a heat-sealable polyolefin comprising a metallocene polyethylene material is co-extruded together with the third layer 17b of a heat-sealable polyolefin on the opposite side of the laminate.

Figure 6:
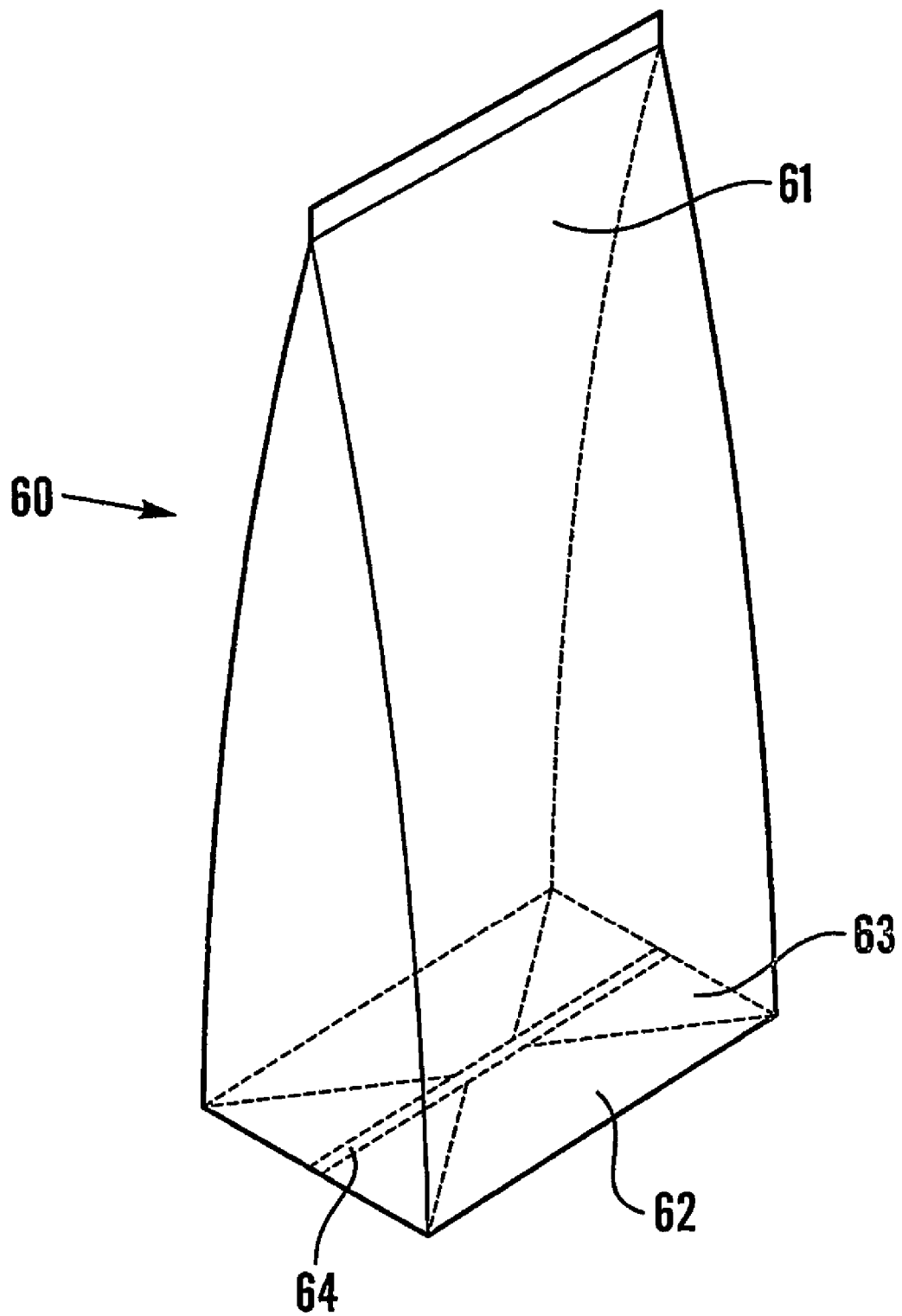
FIG. 6 shows a preferred example of a packaging container produced from the packaging laminate according to the invention.

FIG. 6 shows a preferred example of a packaging container 60 produced from the packaging laminate 10, 30, 40, 50 according to the invention. The packaging container is particularly suitable for beverages, sauces, soups or the like. It is especially advantageous that the packaging container can be micro-waved, if it contains sauce or soup or the like, after having been punctured. Typically, such a package has a volume of about 330 ml or less, preferably from about 100 to about 250 ml, for example about 125 ml, 200 ml or about 250 ml. It may be of any configuration, but is preferably shaped as a wedge 61, such that it is easy to handle and dimensionally stable when put on a shelf in the food store or on a table or the like. In order to obtain such a "wedge-shape", the bottom part 62 of the package is fold formed such that the transversal heat seal 64 of the bottom is hidden under the triangular corner flaps 63, which are folded and sealed against the bottom of the package.

By way of conclusion it should be observed that the present invention which has been described above with particular reference to the accompanying drawings, is not restricted to these embodiments described and shown exclusively by way of example, and that modifications and alterations obvious to a person skilled in the art are possible without departing from the inventive concept as disclosed in the appended claims.

The invention claimed is:

1. A packaging laminate comprising a film covered with silicon oxide; a binding layer formed from a binder comprising a polyolefin grafted with an unsaturated alkoxysilane, wherein said grafted polyolefin is blended with a non-grafted polyolefin; and a paper or paperboard bulk layer,
   wherein the binding layer is arranged to be in direct contact with the silicon oxide and the paper or paperboard bulk layer, and to bond the silicon oxide to the paper or paperboard bulk layer.

2. A packaging laminate according to claim 1, wherein said binder is present in the binding layer at 2-35 $g/m^2$ calculated on dry matter.

3. A packaging container manufactured from a packaging laminate according to claim 1.

4. A packaging laminate according to claim 1, wherein said binder is present in the binding layer at 5-30 $g/m^2$ calculated on dry matter.

5. A packaging laminate according to claim 1, wherein said binder is present in the binding layer at 10-25 $g/m^2$ calculated on dry matter.

6. A packaging laminate according to claim 1, wherein the SiOx gas barrier layer is PECVD deposited, wherein x=1.7–2.0, and has a thickness of 80-300 Å.

7. A packaging laminate according to claim 1, wherein it comprises 30-70% by weight of the grafted polyolefin.

8. A packaging laminate according to claim 1, wherein it comprises 40-60% by weight of the grafted polyolefin.

9. A packaging laminate according to claim 1, wherein it comprises 45-55% by weight of the grafted polyolefin.

10. A packaging laminate according to claim 1, wherein it further comprises a first outermost layer of a heat-sealable polyolefin and a second outermost layer of a heat-sealable polyolefin on the opposite side of the laminate, which second outermost layer comprises a metallocene polyethylene material.

11. A packaging laminate according to claim 10, wherein said metallocene polyethylene material is a metallocene low density polyethylene material, preferably a metallocene linear low density polyethylene material.

12. A packaging laminate according to claim 10, wherein the basis weight of the second outermost layer is from 5 to 30 g/m² dry calculated.

13. A packaging laminate according to claim 10, further comprising a third layer of a heat-sealable polyolefin, arranged in direct contact with the second layer of a heat-sealable polyolefin.

14. A packaging laminate according to claim 13, wherein the third layer of a heat-sealable polyolefin is co-extruded with the second layer of a heat-sealable polyolefin.

15. A packaging laminate according to claim 10, wherein the SiOx gas barrier layer, on the film, faces the paper or paperboard bulk layer and is positioned between the paper or paperboard bulk layer and the second outermost layer of a heat-sealable polyolefin.

16. A packaging laminate according to claim 10, wherein the SiOx gas barrier layer, on the film, faces away from the paper or paperboard bulk layer and is positioned between the paper or paperboard bulk layer and the second outermost layer of a heat-sealable polyolefin.

17. A packaging laminate according to claim 16, wherein the SiOx gas barrier layer is directly bonded to the second outermost layer of a heat-sealable polyolefin, by said binding layer.

18. A packaging laminate according to claim 10, wherein the basis weight of the second outermost layer is from 8 to 25 g/m² dry calculated.

19. A packaging laminate according to claim 10, wherein the basis weight of the second outermost layer is from 10 to 20 g/m² dry calculated.

20. A packaging laminate according to claim 1, wherein the SiOx gas barrier layer is PECVD deposited, wherein $x=1.7-2.0$, and has a thickness of 50-500 Å.

21. A packaging laminate according to claim 20, wherein it comprises a second gas barrier layer of SiOx, coated onto a polymer carrier layer, the first and second gas barrier layers of SiOx being arranged on opposite sides of the paper or paperboard bulk layer.

22. A packaging laminate according to claim 21, wherein the SiOx gas barrier layers are positioned in the laminate such that they are facing towards each other.

* * * * *